United States Patent [19]

Ribi

[11] Patent Number: 4,671,525
[45] Date of Patent: Jun. 9, 1987

[54] ELASTIC SUSPENSION FOR THE REAR WHEELS OF MOTOR VEHICLES

[76] Inventor: Valentino Ribi, Av. Manuel Hurtado 22, Panama, Panama

[21] Appl. No.: 794,032

[22] Filed: Nov. 1, 1985

Related U.S. Application Data

[62] Division of Ser. No. 568,316, Jan. 4, 1984, abandoned.

[30] Foreign Application Priority Data

Jan. 4, 1983 [IT] Italy ................................ 12402 A/83

[51] Int. Cl.$^4$ ............................................ B62K 25/04
[52] U.S. Cl. .................................... 280/284; 180/227
[58] Field of Search ................ 280/284, 285; 180/227, 180/72

[56] References Cited

U.S. PATENT DOCUMENTS

| | | | |
|---|---|---|---|
| 3,917,313 | 11/1975 | Smith et al. ......................... | 280/284 |
| 4,058,181 | 11/1977 | Buell ................................... | 280/284 |
| 4,322,088 | 3/1983 | Miyakoshi et al. ................. | 280/284 |
| 4,463,824 | 8/1984 | Boyesen ............................. | 280/284 |
| 4,511,013 | 4/1985 | Miyakoshi et al. ................. | 280/284 |

FOREIGN PATENT DOCUMENTS 450898  8/1949  Italy .................................... 280/284

Primary Examiner—Richard A. Bertsch
Attorney, Agent, or Firm—Pollock, Vande Sande & Priddy

[57] ABSTRACT

Elastic suspension for the rear wheels of motor vehicles, particularly of motorcycles, comprising two upwardly conveying suspension arms (3,4) which by their upper ends are pivotally connected at two different pivot points (103,104) to the vehicle frame (1), and by their lower ends are pivotally connected at two different pivot points (203,204) to a wheel-carrying member (5), whereby an articulated quadrilateral is formed, which lies in a plane parallel to the rear wheel plane, or to the longitudinal vertical median plane of the vehicle. The rear wheel-carrying member (5) has a rearward extension (105) extending outwardly of the articulated quadrilateral, and the rear wheel (2) is mounted onto this rearward extension (105).

7 Claims, 4 Drawing Figures

ELASTIC SUSPENSION FOR THE REAR WHEELS OF MOTOR VEHICLES

This is a division of application Ser. No. 568,316 filed 1-4-84 abandoned.

FIELD OF THE INVENTION

The present invention relates to an elastic suspension for the rear wheels, particularly the driving wheels, of motor vehicles, and particularly of motorcycles.

SUMMARY OF THE INVENTION

The object of the invention aims is to render it possible to simply and easily obtain an excursion of the rear wheel axle along any desired defined path, namely, the path which is most suitable for the intended use of the vehicle, particularly an excursion along a substantially rectilinear, more straight path, namely along a sensibly less curved path which is substantially less curved than any path that could be obtained with prior art suspensions.

This object is attained by a suspension of the aforementioned kind, which comprises two preferably upwardly converging suspension arms articulatedly connected by their upper ends at two different pivot points to the vehicle frame, and by their lower ends at two different pivot points to a wheel-carrying member, whereby an articulated quadrilateral is formed, which is included in a plane parallel to the rear wheel plane, or to the longitudinal vertical median plane of the vehicle, the wheel-carrying member having a rearward extension extending outwardly of the articulated quadrilateral, on which the rear wheel is mounted.

The rear wheel mounted onto the vehicle through the suspension according to the invention, may be a driving wheel, which can be driven in any suitable way. More particularly, when the invention is, for example, applied to the rear wheel of a motorcycle or a like vehicle, this rear wheel may be driven by a driving sprocket which is directly or indirectly connected to the engine of such a vehicle, and is fitted on the vehicle frame, co-axially with the pivot point for one of the suspension arms. Through drive means, such as a chain, a gear train, a shaft, or like means, the said driving sprocket drives a guide sprocket, possibly a twin guide sprocket, which is mounted co-axially with the pivot for the pivotal connection of the said one suspension arm to the wheel-carrying frame, and which through further drive means, such as a chain, a gear train, a shaft, or like means, in turn drives the rear wheel.

In another embodiment of the invention particularly adapted for an application to motorcycles, or like vehicles, the rear wheel thereof, which is mounted onto the rearward extension of the rear wheel-carrying member forming part of the articulated quadrilateral suspension, may be driven through a drive chain engaged in a sprocket integral with the rear wheel itself. The said drive chain is led about at least one guide sprocket fitted on the rear wheel-carrying member, preferably near the pivotal connection of one of the suspension arms to the rear wheel-carrying member, and about one or more sprockets fitted on the vehicle frame. Of these latter sprockets, one is a driving sprocket, and the uppermost of them, which is either a driving or a guide sprocket, lies above the ideal plane passing through the instantaneous pivoting point at the rear wheel-carrying member and through the rear wheel axis, at least in the unloaded (fully expanded) position of the suspension.

In the suspension according to the invention, the one or more elastic suspension means and the shock absorber or absorbers may be located at any positions and between any members, such as between the motor-vehicle frame and one or more of the arms or pivot points of the articulated system, and/or of the wheel-carrying member extension, and/or between two pivot points of the articulated system and/or between two arms thereof, and these elastic suspension means and shock absorbers may be constructed in any desired manner.

BRIEF DESCRIPTION OF THE DRAWINGS

The features of the invention and the advantages arising therefrom will clearly appear in the following description of several embodiments thereof, diagrammatically shown in side elevational views in the accompanying drawings, in which.

DESCRIPTION OF THE PREFERRED EMBODIMENTS

Figure 1:
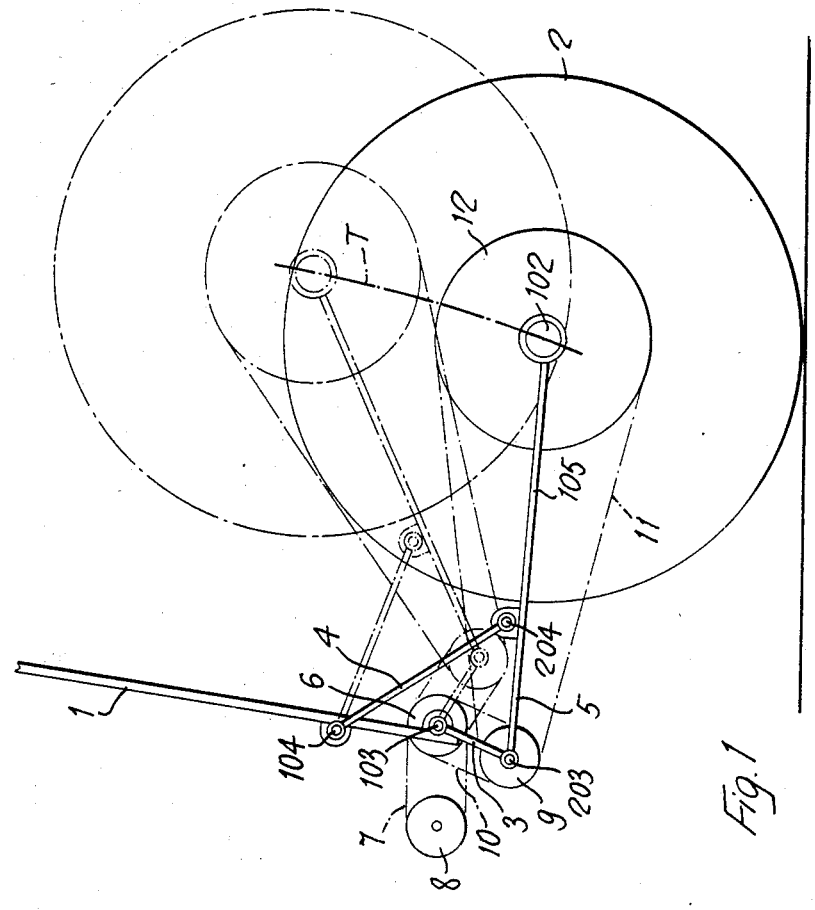
FIG. 1 shows one embodiment of the invention, in which the driving rear wheel, which is supported by an articulated quadrilateral suspension, is driven by a plurality of drive chains led about sprockets arranged co-axially with the pivot points for one of the suspension arms.

In FIG. 1, reference numeral 1 denotes a part of a motor vehicle frame, more particularly of a motorcycle frame, and reference numeral 2 denotes a rear wheel of a motor vehicle, more particularly the rear wheel of a motorcycle.

The elastic suspension for the rear wheel 2 consists of an articulated system which is contained in a plane substantially parallel to the plane of the rear wheel 2, or to the longitudinal vertical median plane of the vehicle. This articulated system comprises two upwardly converging suspension arms 3 and 4, which by their respective upper ends are pivotally connected at 103 and 104 to the vehicle frame 1. The lower ends of said suspension arms 3 and 4 are in turn pivotally connected at 203 and 204, to a rear wheel-carrying member 5, whereby an articulated quadrilateral is formed, with pivot points 103,104,204,203, and with sides 1,3,4,5.

Even though the two suspension arms 3,4 always converge upwards toward each other, they may be inclined with respect to the vertical either in opposite directions, such as in the illustrated example, or in the same direction, either backward or forward with respect to the direction of movement of the vehicle.

The rear wheel-carrying member 5 has an extension 105 extending rearward outwardly of the said articulated quadrilateral, i.e., beyond the pivot point 204 for the suspension arm 4, and carrying the axle 102 of the rear wheel 2. In motorcycles or like vehicles, the wheel-carrying member 5 and its extension 105 form the fork for the rear wheel 2.

Specifically in the case of motorcycles, the rear wheel 2 is a driving wheel that may be connected in any suitable way to the engine mounted onto the frame 1 of the vehicle. In the illustrated embodiment, the drive for the rear wheel 2 is taken from sprocket 6, which may be driven either directly by the driving shaft of the engine, arranged co-axially thereto, or indirectly through suitable drive means, such as a chain 7 and a co-axial sprocket 8 secured to the said driving shaft. In any case, the sprocket 6 is fitted on the vehicle frame 1 co-axially with the pivot 103 for the articulated connection of the suspension arm 3 to the vehicle frame itself. On pivot 203 for the articulated connection of the said suspension arm 3 to the wheel-carrying member 5, there is fitted a twin guide sprocket 9 driven through a chain 10 by the sprocket 6, and which through a chain 11 in turn drives a sprocket 12 that is arranged co-axially to, and integral with, the rear wheel 2.

The rear wheel-driving sprocket 6 may be fitted on the frame 1 so as to be arranged in a co-axial relation with the pivot point 104 for the suspension arm 4, and the twin guide sprocket 9 may be arranged co-axially with the pivot 204 for the articulated connection of the said suspension arm 4 to the rear wheel-carrying member 5. In both instances, the drive chain 10 led about the two sprockets 6 and 9 may be replaced by a gear train fitted on the suspension arm 3, or on the suspension arm 4. Also the drive chain 11 led about the twin guide sprocket 9 and the sprocket 12 on the rear wheel 2 may be replaced by a gear train fitted on the rear wheel-carrying member 5 and on its extension 105. At least one of the chain drives 10, 11, respectively between the driving sprocket 6 and the twin guide sprocket 9, and between this sprocket 9 and the sprocket 12 on the rear wheel 2, may be replaced by a shaft and a bevel gearing at both ends thereof.

In FIG. 1, the unloaded condition of the suspension according to the invention is shown by solid lines, while its maximum loaded condition is shown by dash-and-dot lines. The movement of the several members forming part of the articulated system will be evident by observing the position these members assume in these two conditions. The path T, along which the axle 102 of the rear wheel 2 performs its excursion, is also evident in this figure. In the illustrated embodiment, the excursion path T of the wheel axle 102 is almost rectilinear or slightly curved and is inclined, from below upwardly, in a backward direction, with reference to the direction of movement of the vehicle. With the suspension according to the invention it is however possible to obtain, by simply modifying the geometry of the articulated system, an excursion of the rear wheel 2 along any desired path T and with any desired inclination and orientation, which will be the most suitable for adapting a particular motor-vehicle to any specific requirements of its intended use.

Figure 2:
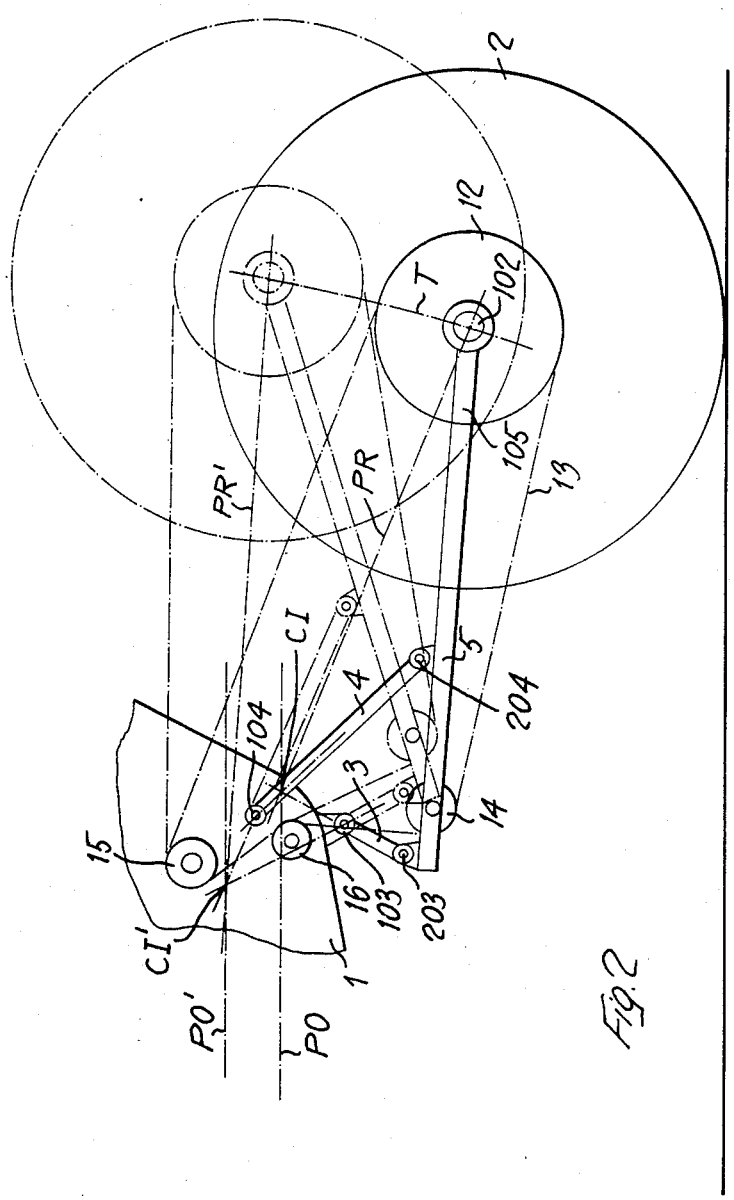
FIGS. 2, 3 and 4 show three variants of a further embodiment of the invention, in which the driving rear wheel, which is supported by an articulated quadrilateral suspension, is driven through only one drive chain.
Figure 3:
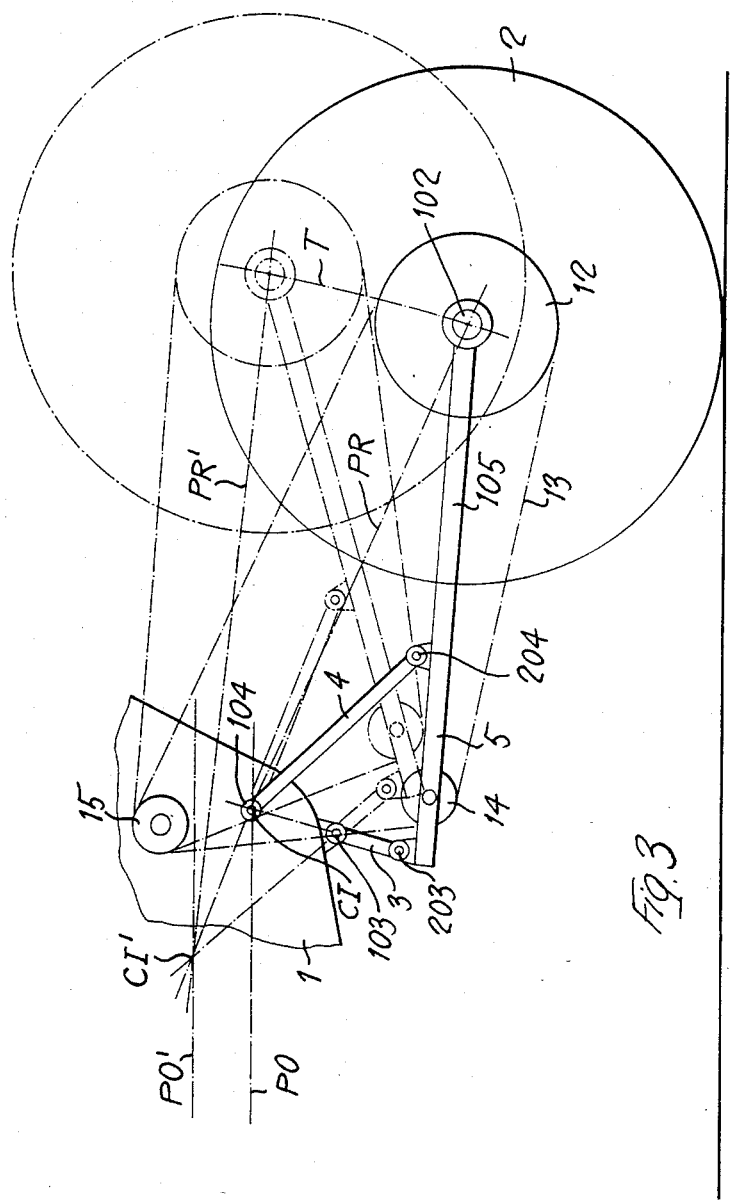
Figure 4:
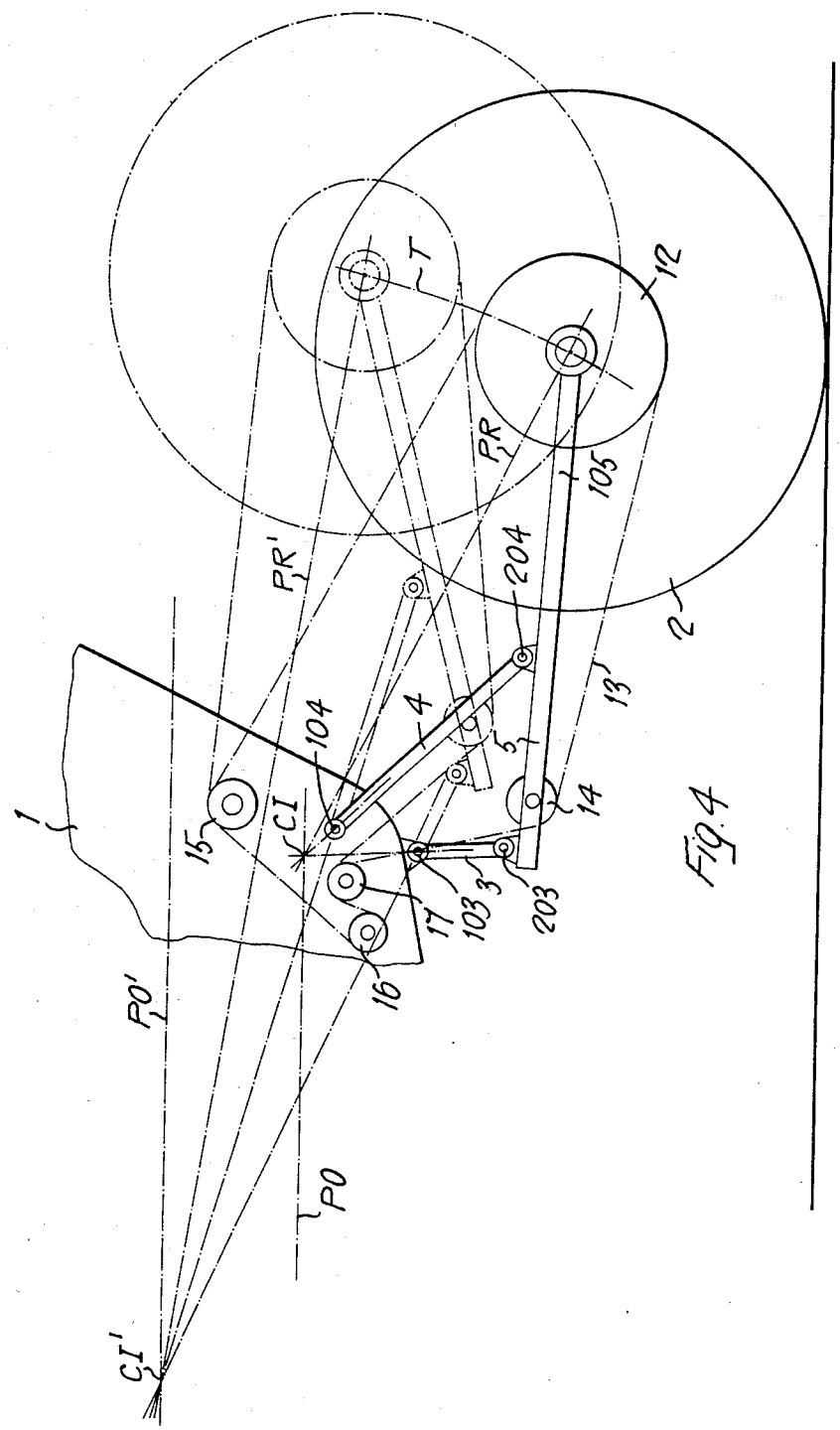

In the embodiments according to FIGS. 2 to 4, in which like parts are designated by the same reference numerals, the articulated quadrilateral suspension for the rear wheel 2 is similar to the suspension shown in FIG. 1. In these FIGS. 2 to 4, the unloaded condition of the suspension is also shown by solid lines, while its maximum loaded condition is shown by dash-and-dot lines. In FIGS. 2, 3, 4, CI denotes the instantaneous pivoting point of the suspension in its unloaded condition, and CI' denotes the instantaneous pivoting point of the suspension in its maximum loaded condition.

It is apparent that in the modified embodiment according to FIG. 2, the articulated quadrilateral forming the suspension is so constructed that when the suspension is in its unloaded condition, the instantaneous suspension pivoting point CI lies on the longer suspension arm 4. In the modified embodiment according to FIG. 3, the instantaneous suspension pivoting point CI is located, with the suspension in its unloaded condition, on the pivot 104 for the articulated connection of the longer suspension arm 4 to the vehicle frame 1. In the modified embodiment according to FIG. 4, the instantaneous pivoting point CI of the suspension is located, with the suspension in its unloaded condition, at the ideal point of intersection of the ideal prolongations of the two suspension arms 3 and 4. Of course, all these modified embodiments of the articulated quadrilateral rear wheel suspension merely constitute possible constructional examples of this novel suspension.

In the embodiments according to FIGS. 2 to 4, when the rear wheel 2 is a driving wheel, this rear wheel is driven through only one endless drive chain 13 led about the sprocket 12 on the rear wheel 2, and about a guide sprocket 14 fitted on the rear wheel-carrying member 5, as well as about one or more sprockets 15, 16 and 17 fitted on the vehicle frame 1, at least one of these latter sprockets being a driving sprocket. More particularly, the guide sprocket 14 on the rear wheel-carrying member 5 is mounted in proximity of the pivot 203 or 204 for the articulated connection of one of the suspension arms 3 or 4 to the rear wheel-carrying member 5. Moreover, at least one of the sprockets fitted on the vehicle frame 1 (in the illustrated embodiments the sprocket 15) is located above the ideal plane PR passing through the instantaneous pivoting point CI of the suspension and through the axis of the rear wheel 2, and/or above the horizontal ideal plane PO passing through this instantaneous pivoting point CI. This condition relating to the position of the upper sprocket 15 will be valid at least in the unloaded (fully expanded) condition of the suspension, or in all the positions of the elastic excursion of the rear wheel 2, as appears from the maximum loaded (fully contracted) condition of the suspension, shown by dash-and-dot lines in FIGS. 2 to 4, in which the said planes PO and PR, corresponding to the loaded (fully contracted) condition of the suspension, and passing through the instantaneous pivoting point CI' of the suspension, are designated by PO' and PR'. More particularly, in the modified embodiment according to FIG. 2, on the vehicle frame 1 there is provided, in addition to the said upper sprocket 15, only another sprocket 16 for the drive chain 13. One of the said sprockets, such as, for example, the sprocket 16 located at a lower level than the upper sprocket 15, is formed as a driving sprocket, while the other sprocket 15 is only a guide sprocket.

In the modified embodiment according to FIG. 3, on the vehicle frame 1 there is only provided the upper sprocket 15, which is therefore constructed as driving sprocket for the drive chain 13.

In the modified embodiment according to FIG. 4, the drive chain 13 is led not only about the said upper sprocket 15 that overlies the planes PO and/or PR, but also about two other sprockets 16 and 17 fitted on the vehicle frame 1. Any one of these sprockets 15, 16 and 17, and for example the sprocket 16, may be the driving sprocket.

In any case, in the embodiments according to FIGS. 2 to 4, the position of the guide sprocket 14 fitted on the rear wheel-carrying frame 5, and the position of the upper sprocket 15 fitted on the vehicle frame 1, are so selected that any changes in the length of the drive chain 13, which are due to the elastic excursion of the rear wheel 2, will always be small, and will be absorbed by the slack normally existing or being allowed in the drive chain.

In the drawings, the one or more spring means and the respective shock absorber or absorbers for the illustrated suspensions have been omitted. These spring means and the respective shock absorber or absorbers may be constructed in any suitable manner and may be provided between any locations or members of the suspension, which tend to be relatively moved with respect to one another owing to the load, such as, for example, between the vehcile frame 1 on the one hand, and any one of arms 3,4,5,105 or pivot points 203,204 of the articulated system on the other hand, or between any arm or pivot point of the articulated system.

The suspension according to the invention can be applied to the rear wheel or wheels of any vehicle with two, three, four, or more wheels to the rear wheels of motorcycles, motorcars, trucks, and like vehicles as well as to the wheels of the undercarriages of airplanes and like crafts.

Not only the advantages as pointed out in the preamble are afforded by this invention, but also the possibility of performing a long elastic excursion is given to the rear wheel, with the effect of counteracting its sinking during an acceleration, and its raising when braked, and/or with the effect of progressively reducing the ratio between the excursion of the wheel and the excursion of the shock absorber, particularly toward the end of their travel.

I claim:

1. An elastic suspension for the rear wheels of motor vehicles, comprising two preferably upwardly converging suspension arms (3, 4), which by their upper ends are pivotally connected at two different pivot points (103, 104) to a vehicle frame (1), and by their lower ends are pivotally connected at two different pivot points (203, 204) to a rear wheel-carrying member (5), thereby forming an articulated quadrilateral (103, 104, 204, 203-1, 3, 4, 5) located in an plane (PO) parallel to the plane to the longitudinal vertical median plane of said vehicle, said rear wheel-carrying member (5) having a rearward extension outwardly of said articulated quadrilateral (103, 104, 204, 203-1, 3, 4, 5), and said rear wheel (2) being mounted on said rearward extension (105) of said rear wheel-carrying member (5), wherein the rear wheel (2) is driven through a drive chain (13) engaged with a sprocket (12) made integral with said rear wheel (2) and also led about at least one guide sprocket (14) fitted on the wheel-carrying member (5) and about at least one upper sprocket (15) fitted on the vehicle frame (1) above the ideal plane (PR) passing through the instantaneous pivoting point of the rear wheel-carrying member (5) and the axis of the rear wheel (2), at least in the unloaded (fully expanded) position of the suspension.

2. The suspension according to claim 1, wherein the said upper sprocket (15) fitted on the vehicle frame (1) is the driving sprocket.

3. The suspension according to claim 1, wherein the said upper sprocket (15) fitted on the vehicle frame (1) is a guide sprocket, the drive chain (13) being led about at least one additional sprockets (16,17) fitted on the vehicle frame (1), and one of these (16,17) being the driving sprocket.

4. The suspension according to any one of claims 1 to 3, wherein the upper sprocket (15) fitted on the vehicle frame (1) and having the drive chain (13) passed therearound is always located above the ideal horizontal plane (PO) passing through the instantaneous pivoting point (CI) of the suspension, and above the ideal plane (PR) passing through the axis of the rear wheel (2) and through the said instantaneous pivoting point (CI), at least in the unloaded (fully expanded) position of the suspension.

5. The suspension according to any one of claims 1 to 3, wherein the guide sprocket (14) on the wheel-carrying member (5) is fitted adjacent the pivot (203) for the articulated connection of one (3) of the suspension arms (3,4) to the wheel-carrying member (5) itself.

6. The suspension according to any one of claims 1 to 3, wherein the guide sprocket (14) on the wheel-carrying member (5) and the upper sprocket (15) on the vehicle frame (1) are respectively fitted in such a position as to permit the elastic excursion of the rear wheel (2), with any small changes in the length of the drive chain (13) occurring within the limits of the slack in the drive chain (13).

7. The suspension according to any one of claims 1 to 3, wherein the upper sprocket (15) fitted on the vehicle frame (1) and having the drive chain (13) passed therearound is always located above the ideal plane (PR) passing through the axis of the rear wheel (2) and through the said instantaneous pivoting point (CI), at least in the unloaded (fully expanded) position of the suspension.

* * * * *